United States Patent
Hata et al.

(10) Patent No.: US 7,196,444 B2
(45) Date of Patent: Mar. 27, 2007

(54) STEPPING MOTOR FOR USE IN HIGH-TEMPERATURE ENVIRONMENTS

(75) Inventors: Masato Hata, Shizuoka (JP); Yazuru Suzuki, Shizuoka (JP); Atsushi Fukushima, Shizuoka (JP); Naoyuki Harada, Shizuoka (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/135,650

(22) Filed: May 24, 2005

(65) Prior Publication Data

US 2005/0264117 A1    Dec. 1, 2005

(30) Foreign Application Priority Data

May 24, 2004 (JP) .......................... P. 2004-153671
Mar. 24, 2005 (JP) .......................... P. 2005-086531

(51) Int. Cl.
    H02K 5/16    (2006.01)
(52) U.S. Cl. ....................................... 310/90
(58) Field of Classification Search .............. 310/49 R, 310/89–90
    See application file for complete search history.

(56) References Cited

U.S. PATENT DOCUMENTS

| | | | | |
|---|---|---|---|---|
| 4,381,747 A | * | 5/1983 | Kobayashi et al. | 123/339.26 |
| 4,438,361 A | * | 3/1984 | Manson | 310/90 |
| 4,501,981 A | * | 2/1985 | Hansen | 310/49 R |
| 4,714,850 A | * | 12/1987 | Akiba et al. | 310/49 R |
| 5,856,718 A | | 1/1999 | Matsushita et al. | |
| 6,404,086 B1 | * | 6/2002 | Fukasaku et al. | 310/89 |

FOREIGN PATENT DOCUMENTS

JP    10-290548 A    10/1998

* cited by examiner

*Primary Examiner*—Thanh Lam
(74) *Attorney, Agent, or Firm*—Foley & Lardner LLP

(57) ABSTRACT

There is provided a stepping motor comprising: a stator assembly; a rotor assembly rotatably disposed inside the stator assembly, and including a rotary shaft rotatably supported by bearings, a sleeve fixedly attached onto the rotary shaft, and at least one magnet disposed outside the sleeve; and a preloading mechanism disposed between the sleeve and one of the bearings, and including a coil spring, and a spring holder which is composed of an outer case shaped in a cup-like configuration and an inner case shaped in a cup-like configuration, and which is adapted to house the coil spring. In the stepping motor described above, the spring holder of the preloading mechanism is formed of reinforced polyamide resin, and a washer member having a high sliladability is disposed between the preloading mechanism and the one bearing.

7 Claims, 4 Drawing Sheets

STEPPING MOTOR FOR USE IN HIGH-TEMPERATURE ENVIRONMENTS

BACKGROUND OF THE INVENTION

1. Field of the Invention

The present invention relates to a stepping motor, and more particularly to a stepping motor which is used in high-temperature environments and/or frictional heat generating environments therefore requiring heat resistance performance.

2. Description of the Related Art

Stepping motors, which are conveniently and well controllable, are used in various audio visual and office automation equipments. Especially, permanent magnet (PM) stepping motors are extensively used also in various control equipments carried in a vehicle due to low cost. Among the control equipments, for example, a following-distance sensor, and a headlamp optical axis controller are known. In a following-distance sensor, in which an ultrasonic sound wave is projected onto a preceding vehicle, and a reflected wave from the preceding vehicle is received for measuring a distance from the preceding vehicle, a crankshaft is attached to a rotary shaft of a stepping motor so as to swing a sensor in a given range. And, in a headlamp optical axis controller, a headlamp optical axis is controlled in the horizontal and vertical directions by means of gears attached to rotary shafts of stepping motors. Stepping motors incorporated in the following-distance sensor and the headlamp optical axis controller are required to stably operate with specified characteristics for a long period of time under high-temperature environments.

FIG. 3 is an explanatory view of a headlamp optical axis controller for a vehicle. A headlamp 50 is adapted to swing vertically about a support pin 51 as a fulcrum by means of a first screw 52, and horizontally about the support pin 51 by means of a second screw 53. The first screw 52 is rotated by a first motor 54 for vertical control of an optical axis of the headlamp 50, while the second screw 53 is rotated by a second motor 55 for horizontal control thereof. The first and second motors 54 and 55 have, on their rotary shafts, respective pinion gears 56 and 57 which are engaged with respective crown gears 58 and 59 attached to the ends of the first and second screws 52 and 53.

The first and second motors 54 and 55 are PM stepping motors which are structured so as to include a plate spring or a coil spring for the purpose of applying preload. The plate spring tends to incur an instable spring constant and cause variation in torque characteristics thus failing to achieve a stable motor performance. For this reason, the coil spring is preferred in view of preventing variation in torque characteristics.

FIG. 4 is a side view (partly sectioned) of a conventional PM stepping motor which includes a coil spring for preloading purpose as described above (refer to, for example, Japanese Patent Application Laid-Open No. H10-290548).

Referring to FIG. 4, a stepping motor 60 comprises a stator assembly 61, and a rotor assembly 62 rotatably disposed inside the stator assembly 61. The stator assembly 61 is composed of a first stator unit 68 and a second stator unit 69. The first stator unit 68 includes a coil 70 wound around a bobbin 71, and stator yokes 72 and 73, and the second stator unit 69 includes a coil 74 wound around a bobbin 75, and stator yokes 76 and 77. The rotor assembly 62 includes a rotary shaft 63, a sleeve 64, and a magnet 65 fixedly attached to the outer circumference of the sleeve 64. The rotary shaft 63 is rotatably supported by a bearing 66 and a bearing 67. A preloading mechanism 78 is disposed between the sleeve 64 and the bearing 67. The preloading mechanism 78 includes a coil spring 81 adapted to generate preloading force, and a spring holder which is composed of an outer case 79 formed of polyacetal (POM) resin and shaped into a cup-like configuration, and an inner case 80 formed of POM resin, shaped into a cup-like configuration and nested in the outer case 79, and which houses the coil spring 81. The preloading mechanism 78 thus structured applies preload against the rotor sleeve 64, that is to say, the rotor assembly 62. The preloading mechanism 78 slides against the bearing 67 while rotating together with the rotor assembly 62. A plain washer 82 is disposed between the sleeve 64 and the bearing 66.

A problem is caused when the stepping motor 60 described above is incorporated in a device, for example, the aforementioned following distance sensor, or headlamp optical axis controller, which is used in high-temperature environments, and/or in which the stepping motor 60 rotates at a so high speed as to generate frictional heat. Specifically, the preloading mechanism 78 is subject to a high temperature coming from the environmental heat and/or the frictional heat due to the high-speed rotating preloading mechanism 78 sliding against the bearing 67. Therefore, the spring holder, which is composed of the outer case and inner cases 79 and 80 formed of POM resin having a deflection temperature of about 135 degrees C. under a load of 1.8 MPa, is thermally decomposed thus failing to maintain its original configuration. This leads to failing to apply an appropriate preload and consequently deteriorating the performance of the stepping motor 60. The frictional heat is generated when the stepping motor 60 is rotated at a high speed, and can lead to a substantially high temperature even when the stepping motor 60 is used in non-high-temperature environments.

SUMMARY OF THE INVENTION

The present invention has been made in light of the above problem, and it is an object of the present invention to provide a stepping motor which duly functions without deterioration in performance when used in high-temperature and/or frictional heat generating environments.

In order to achieve the object described above, according to an aspect of the present invention, there is provided a stepping motor which comprises: a stator assembly; a rotor assembly rotatably disposed inside the stator assembly, and including a rotary shaft rotatably supported by bearings, a sleeve fixedly attached onto the rotary shaft, and at least one magnet disposed outside the sleeve; and a preloading mechanism disposed between the sleeve and one of the bearings, and including a coil spring, and a spring holder composed of outer and inner cases each shaped in a cup-like configuration, and adapted to house the coil spring. In the stepping motor described above, the spring holder of the preloading mechanism is formed of reinforced polyamide resin, and a washer member having a high slidability is disposed between the preloading mechanism and the one bearing. Consequently, the spring holder of the preloading mechanism is strong, and frictional heat is not generated due to the highly slidable washer member disposed, the spring holder does not suffer damages when the stepping motor rotates at a high speed in high-temperature environments, thus the stepping motor is prevented from deteriorating in its performance.

In the aspect of the present invention, the washer member may be formed of resin having a high lubricating ability.

Consequently, the washer member is less costly than a washer member formed of oil impregnated metal.

In the aspect of the present invention, the washer member may have a larger diameter than the one bearing. Since the lubricating oil impregnated in the bearing is prevented from getting scattered away, the operating life of the bearing, eventually the life of the stepping motor, is increased.

In the aspect of the present invention, the rotor assembly may further include a resin portion which is formed by resin injection molding, disposed between the sleeve and the at least one magnet, covers an outer circumferential surface and a part of one end surface of the sleeve, and which has a circular cylindrical hollow for accommodating the preloading mechanism. The preloading mechanism is accommodated in the circular cylindrical hollow of the resin portion and therefore is prevented from rattling.

In the aspect of the present invention, the rotor assembly may further include back yokes, the at least one magnet may be fixedly attached to the back yokes, and the sleeve and the back yokes may be fixed together by means of the resin portion. This structure enables reduction in the volume of the resin portion and accordingly contributes to reducing the weight of the rotor assembly resulting in enhancing the motor performance.

DETAILED DESCRIPTION OF THE PREFERRED EMBODIMENTS

Preferred embodiments of the present invention will hereinafter be described with reference to the accompanying drawings.

Figure 1:
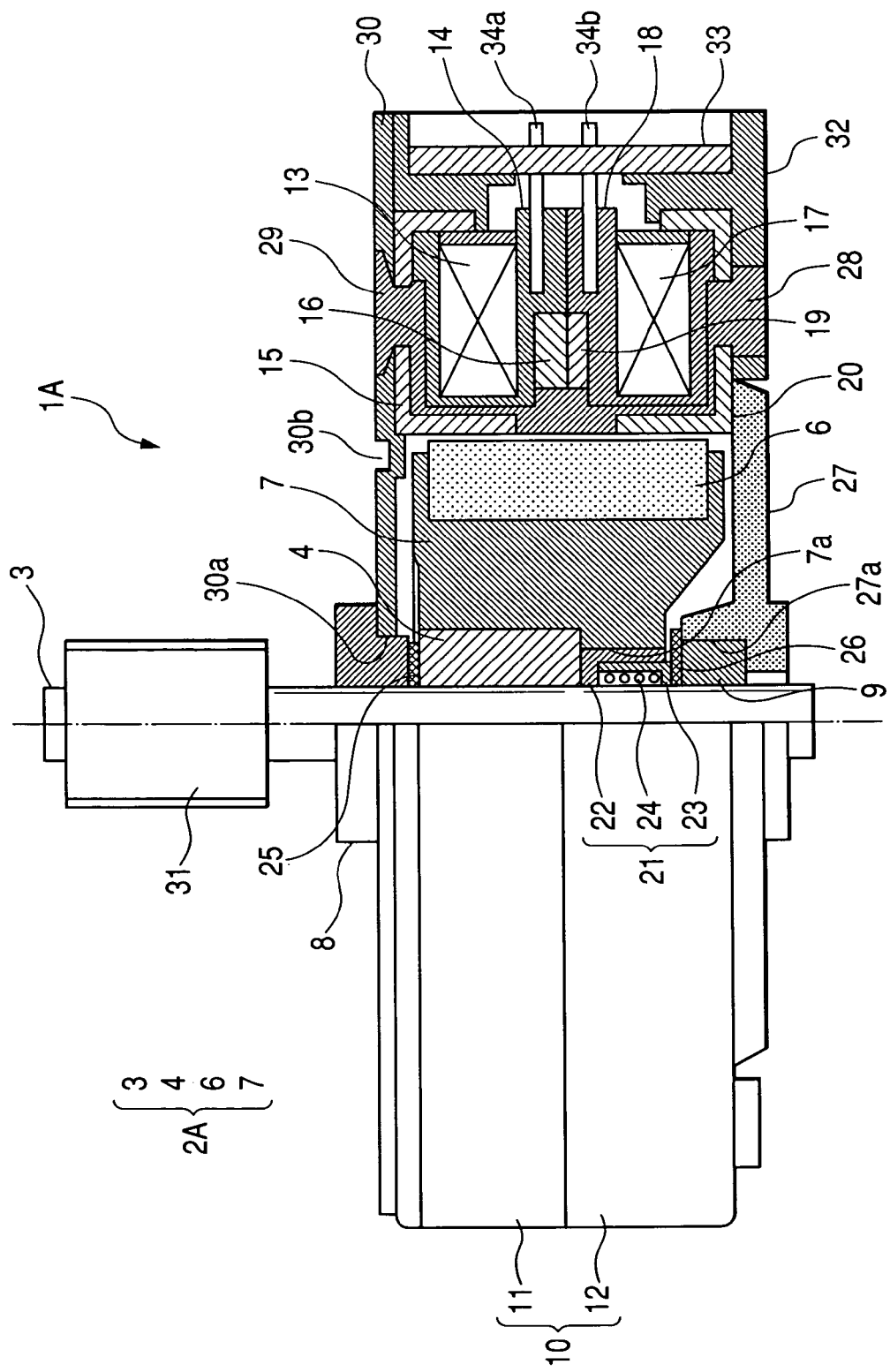
FIG. 1 is a side view (partly sectioned) of a stepping motor according to a first embodiment of the present invention.

Referring to FIG. 1, a stepping motor, specifically a PM stepping motor 1A according to a first embodiment of the present invention comprises a rotor assembly 2A rotatably supported, and a stator assembly 10 to surround the rotor assembly 2A.

The rotor assembly 2A includes a rotary shaft 3, a sleeve 4 formed of a non-magnetic material, and a magnet 6 disposed outside the sleeve 4. The sleeve 4 and the magnet 6 are rigidly fixed together via a resin portion 7 formed therebetween by injection molding. The magnet 6 is shaped into a ring formed of ferrite or a rare earth material, and has multi-pole magnetization provided on its outer circumferential surface. The rotary shaft 3 is rotatably supported by a bearing 8 and a bearing 9. The bearings 8 and 9 may be made of a plastic material or a general metallic material, but most preferably of a lubrication oil-impregnated metal in view of maintenance and cost. The bearings 8 and 9 may alternatively be ball bearings.

The stator assembly 10 is composed of a first stator unit 11 and a second stator unit 12. The first stator unit 11 includes a coil 13 wound around a bobbin 14, and stator yokes 15 and 16. The stator yokes 15 and 16 have respective pole teeth opposing the outer circumferential surface of the magnet 6. In the same way, the second stator unit 12 includes a coil 17 wound around a bobbin 18, and stator yokes 19 and 20. The stator yokes 19 and 20 have respective pole teeth opposing the outer circumferential surface of the magnet 6. The stator yokes 15, 16, 19 and 20 are formed of a soft-magnetic material, for example, an electrogalvanized steel plate (SECC), an electromagnetic soft steel plate (SUY), and a silicon steel plate.

The rotor assembly 2A is fabricated as follows. The sleeve 4 and the magnet 6 are set and put in a mold (not shown), then synthetic resin is injected into the mold thereby forming the resin portion 7 so as to fix together the sleeve 4 and the magnet 6, and the rotary shaft 3 is press-fitted into a through-hole of the sleeve 4.

The resin portion 7 thus formed by resin injection molding covers the outer circumferential surface and a part of one end surface (facing the bearing 9) of the sleeve 4, and defines a circular cylindrical hollow 7a which is a space for housing a preloading mechanism 21 to be described later. The sleeve 4 is made of, for example, aluminum alloy in order to reduce the weight of the rotor assembly 2A. The resin portion 7 is formed of a synthetic resin material, preferably a heat-resisting synthetic resin material, such as polybutylene terephthalate (PBT), which overcomes the application under hot operating conditions like usage with a headlamp in a vehicle. The circumferential surface defined by the circular cylindrical hollow 7a is preferably inclined slightly with respect to the shaft axis for the purpose of achieving a favorable mold-releasability.

The aforementioned preloading mechanism 21 includes a coil spring 24 adapted to generate preloading force, and a spring holder composed of an outer case 22 shaped in a cup-like configuration, and an inner case 23 shaped in a cup-like configuration and nested in the outer case 22 so as to smoothly slide against the outer case 22 in both the axial and the circumferential directions without rattling. The outer and inner cases 22 and 23 may be provided with mechanisms for provisionally holding the coil spring 24.

Figure 4:
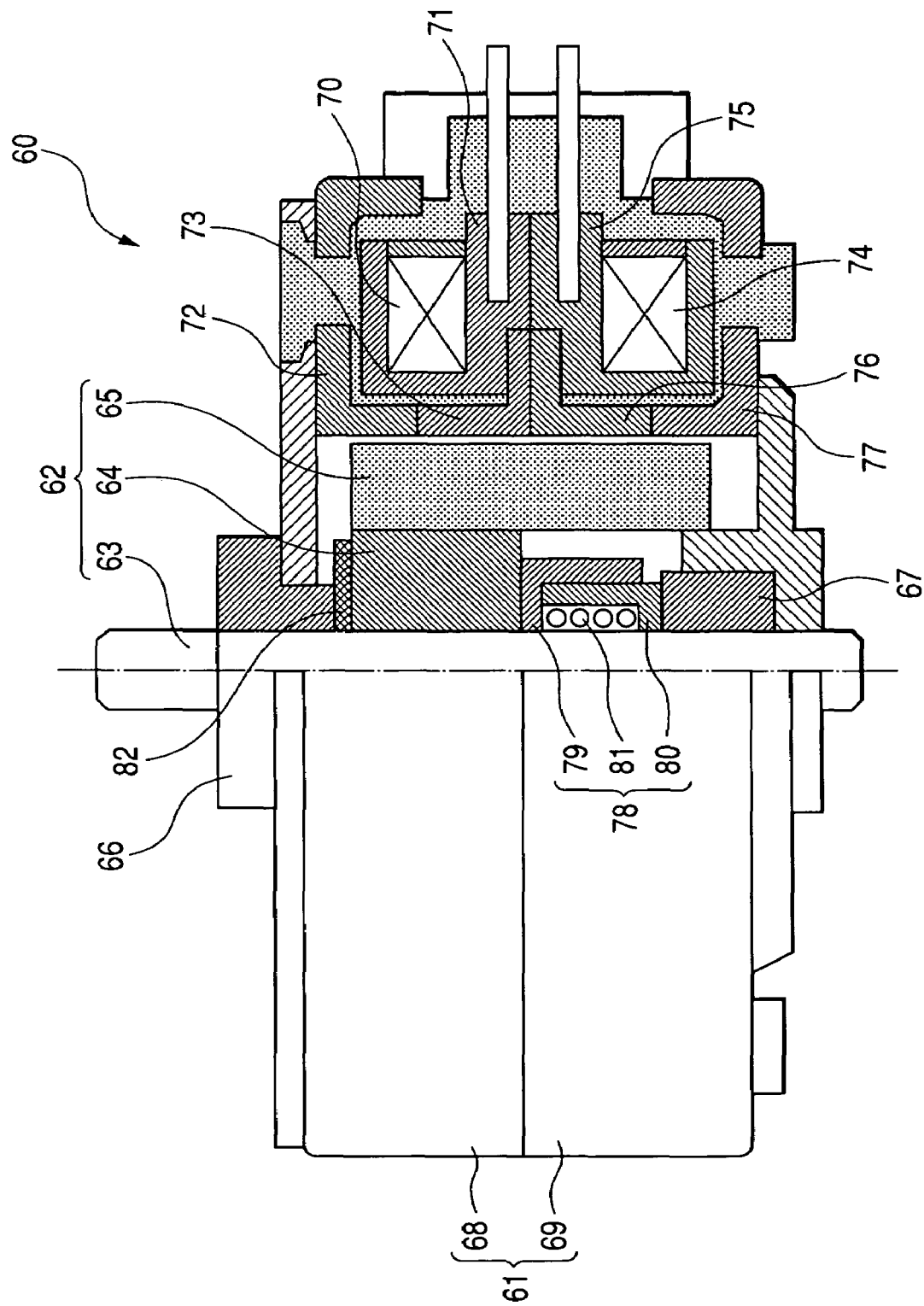
FIG. 4 is a side view (partly sectioned) of a conventional stepping motor.

The preloading mechanism 21 is configured identical with the preloading mechanism 78 of the conventional stepping motor 60 of FIG. 4 but differs therefrom in material for the spring holder (the outer and inner cases), and also in the structure of the resin portion in the rotor assembly. Specifically, the spring holder (the outer and inner cases 22 and 23) of the preloading mechanism 21 in the present embodiment is formed of a synthetic resin having excellent heat-resisting and sliding properties, for example and preferably, a glass fiber-reinforced polyamide resin, such as a glass fiber-reinforced nylon 66 (Leona 1330G of Asahi Kasei Corporation, having a deflection temperature of 248 degrees C. under a load of 1.8 MPa), while the spring holder (the outer and inner cases 79 and 80) of the preloading mechanism 78 shown in FIG. 4 is formed of POM resin.

Another difference is that a washer 26 formed of a material having an excellent slidability is disposed between the inner case 23 of the preloading mechanism 21 and the bearing 9, in addition to a washer 25 disposed between the sleeve 4 and the bearing 8. The washers 25 and 26 are formed of a material enabling a high sliding performance, such as oil-impregnated sintered alloy, and resin having an excellent slidability (in the present invention, a resin material available under the trade name Polislider). Since the washer 26 with a high sliding performance is disposed between the inner case 23 and the bearing 9, the spring holder of the preloading mechanism 21 rotating at a high speed is subject to a reduced frictional heat thus being prevented from melting and breaking. In this connection, but for the washer 26 disposed between the inner case 23 and the bearing 9, the inner case 23 of the preloading mechanism 21, even if formed of reinforced polyamide resin, melts or breaks due to frictional heat thus suffering decrease in preload force, also generating noises, and possibly harming the motor performance eventually.

Further, the washer 26 scarcely rotates because of its excellent sliding properties even when the preloading mechanism 21 including the inner case 23 rotates at a high speed together with the rotor assembly 2A, and therefore does not slide against the bearing 9 thus preventing the lubrication oil impregnated in the bearing 9 from getting scattered away, which results in a longer operating life of the bearing 9. Also, if the washer 26 has a larger diameter than the bearing 9, the bearing 9 has its end surface sealed by the washer 26 and thereby better preventing the lubrication oil from getting scattered away.

The resin parts are formed of thermoplastic resin in view of the heat generated by the parts and the operating environmental temperature, and, when required to have durability, are formed of synthetic resin containing glass fibers with a high mechanical strength. Synthetic resin, however, is basically low in heat conductivity and therefore must have an enlarged heat radiation area for enhancing heat resistance thus resulting in increase of the dimension of the parts. Such a problem is solved by using a resin material containing filler. The resin parts formed of such a resin material radiates heat effectively, and heat resistance can be enhanced without increasing the dimension of the parts. The filler may be alumina, or glass fibers, and the resin may be preferably polyphenylene sulphide.

The stepping motor 1A according to the present embodiment is fabricated as follows.

The first stator unit 11, which includes the stator yokes 15 and 16 arranged such that their respective pole teeth are phase-shifted from each other by 180 degrees in terms of electrical angle, and which includes the bobbin 14 having the coil 13 wound therearound, is put in a mold (not shown). Then, the second stator unit 12, which includes the stator yokes 19 and 20 arranged such that their respective pole teeth are phase-shifted from each other by 180 degrees in terms of electrical angle, and which includes the bobbin 18 having the coil 17 wound therearound, is put in the mold (not shown) so as to sit on the first stator unit 11 such that the second stator unit 12 is phase-shifted from the first stator unit 11 by 90 degrees in terms of electrical angle.

Then, synthetic resin, for example PBT resin, is injected in the mold (not shown) from the side of the second stator unit 12 thereby integrally forming a rear plate 27 defining a recess 27a to house the bearing 9, and bosses 28 and 29, and at the same time filling up the gaps between the pole teeth of the stator yokes 19 and 20 of the second stator unit 12 and gaps between the pole teeth of the stator yokes 15 and 16 of the first stator yoke 11. This way, the first and second stator units 11 and 12 are coupled together, and the stator assembly 10 is completed.

The stator assembly 10 completed is taken out from the mold (not shown). The bearing 9 is put in the recess 27a of the rear plate 27. The bearing 8 is put in a hole 30a formed at the center of a front plate 30. The rotor assembly 2A, in which the rotary shaft 3 has the washer 25 put on its front protruding end and has the preloading mechanism 21 and the washer 26 put on its rear protruding end, is set inside the stator assembly 10 with the rear protruding end of the rotary shaft 3 going through the bearing 9. Then the front plate 30 having the bearing 8 is attached to the first stator unit 11 with the front protruding end of the rotary shaft 3 going though the bearing 8, such that a positioning mechanism 30b formed on the front plate 30 is engagingly aligned to the inner circumference of the stator assembly 10 and also such that the bosses 29 engages press-fittingly into holes formed in the front plate 30. A pinion gear 31 may be attached at a predetermined portion of the front protruding end of the rotary shaft 3, if required so. A holder 32 for attaching a printed board 33 is attached to the outer circumference of the stator assembly 10 such that the holder 32 is fitted in a portion cut out in the first and second stator units 11 and 12, and that a hole formed in the holder 32 engages with one of the bosses 28. And, terminal pins 34a and 34b attached respectively to the bobbins 14 and 18 are inserted through holes of the printed board 33 and soldered therein.

In the stepping motor 1A according to the first embodiment, since the preloading mechanism 21 is housed in the circular cylindrical hollow 7a of the resin portion 7 so as to be surrounded by that the resin portion 7, the resin portion 7 functions as a stopper to hold the preloading mechanism 21 from rattling.

A second embodiment of the present invention will hereinafter be described with reference to FIG. 2. A stepping motor 1B of FIG. 2 is basically identical with the stepping motor 1A of FIG. 1 except the structure of a rotor assembly 2B, and in explaining FIG. 2, any component parts identical with those in FIG. 1 are denoted by the same reference numerals.

The rotor assembly 2B of the stepping motor 1B includes a rotary shaft 3, a sleeve 4, a pair of back yokes 5a and 5b each having a substantially L-letter cross-sectional configuration, and two magnets 6a and 6b each shaped into a ring, each having a multi-pole magnetization provided on its outer circumferential surface, and fixedly attached to the outsides of the back yokes 5a and 5b. The sleeve 4 and the back yokes 5a and 5b are rigidly fixed together via a resin portion 41 formed therebetween. The rotary shaft 3 is rotatably supported by a bearing 8 and a bearing 9.

The rotor assembly 2B is fabricated as follows.

Figure 2:
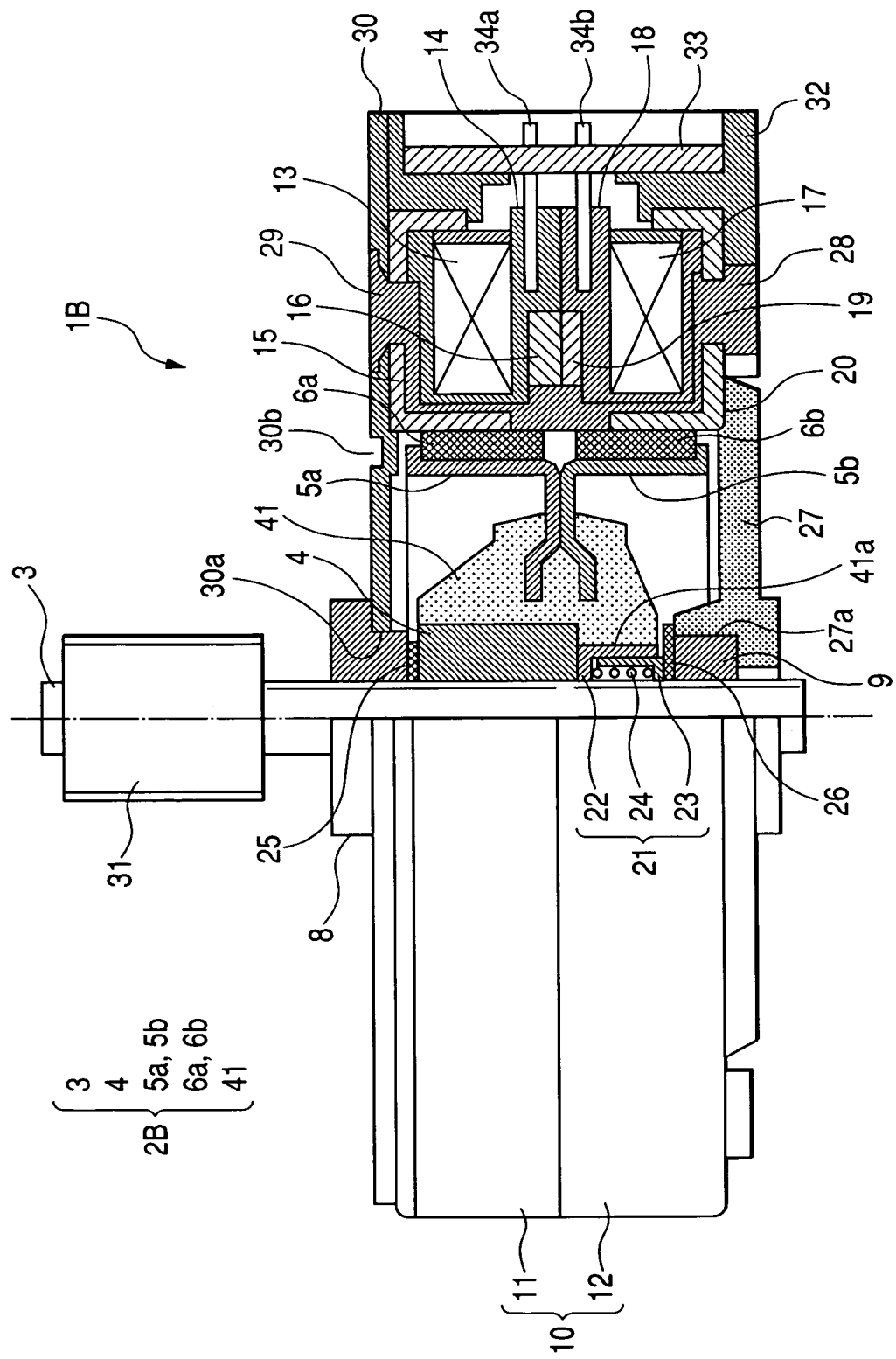
FIG. 2 is a side view (partly sectioned) of a stepping motor according to a second embodiment of the present invention.
Figure 3:
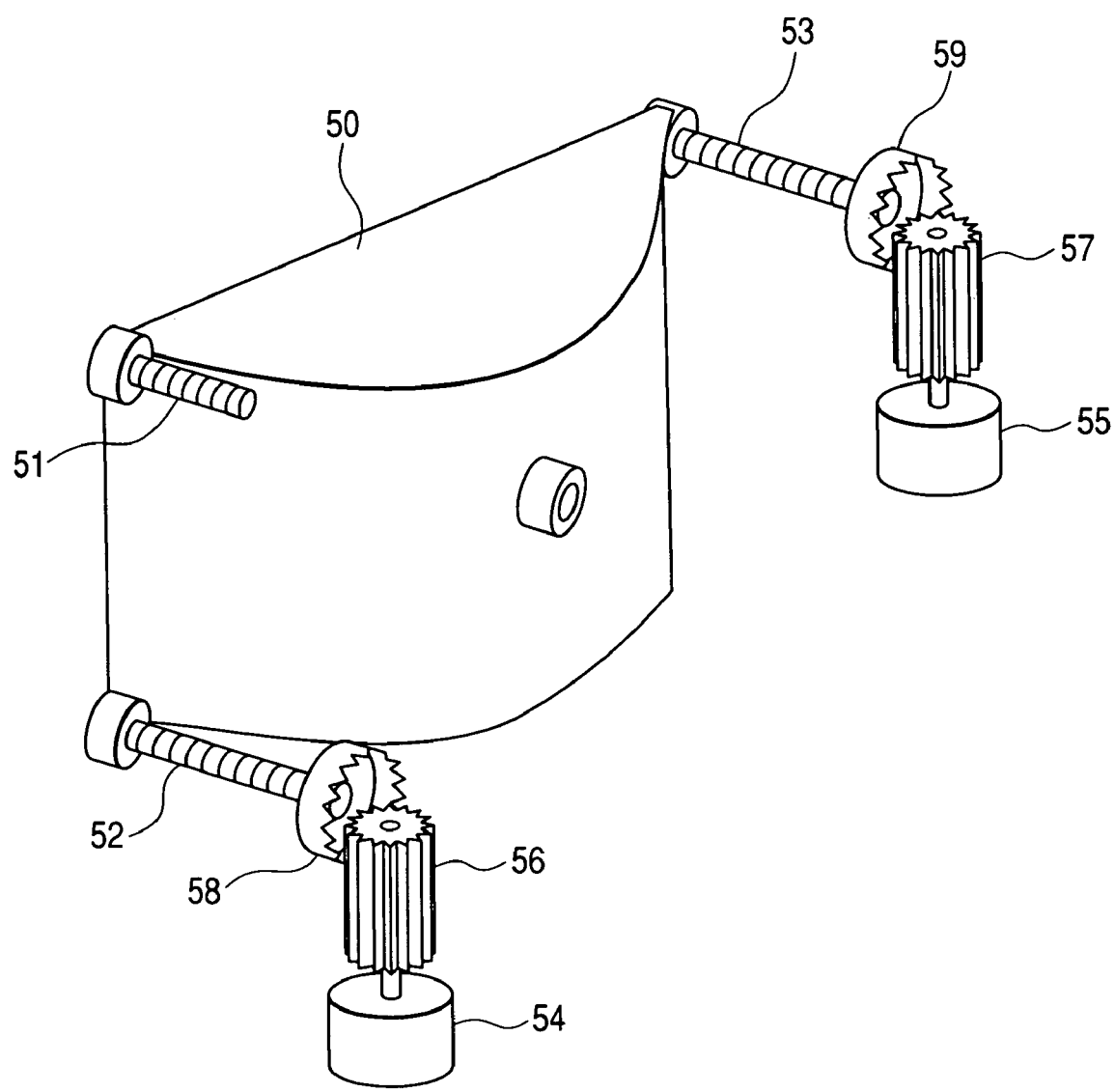
FIG. 3 is an explanatory view of a headlamp optical axis control unit for a vehicle.

The sleeve 4 and the back yokes 5a and 5b are set as shown in FIG. 2 and put in a mold (not shown), then synthetic resin is filled in the mold (not shown) thereby forming the resin portion 41 so as to fix together the sleeve 4 and the back yokes 5a and 5b, and the rotary shaft 3 is press-fitted into a though-hole of the sleeve 4. The resin portion 41 thus formed has a smaller volume than the resin portion 7 of the first embodiment, and covers the outer circumferential surface and a part of one end surface (facing the bearing 9) of the sleeve 4 and some portions of one wing bars of the back yokes 5a and 5b, and defines a circular cylindrical hollow 41a which is a space for housing a preloading mechanism 21. Finally, the magnets 6a and 6b are fixed to the outsides of the back yokes 5a and 5b, and the rotor assembly 2B is completed.

The sleeve 4 is made of, for example, aluminum alloy in order to reduce the weight of the rotor assembly 2B. The resin portion 41 is formed of a synthetic resin material, preferably a heat-resisting synthetic resin material, such as polybutylene terephthalate (PBT), which overcomes the application under hot operating conditions like usage with a headlamp in a vehicle. The back yokes 5a and 5b are made of an aluminum alloy, but may be formed of a soft-magnetic material, for example, an electrogalvanized steel plate (SECC) if the magnetic force of the magnets 6a and 6b needs to be increased. Also, the cross section of the back yokes 5a and 5b is not limited to an L-letter shape. The magnets 6a and 6b are preferably formed of a rare earth material, and Nd—Fe—B and Sm—Fe—N which have particularly excellent magnetic properties are most suitable. The circumferential surface of the circular cylindrical hollow 41a is preferably inclined slightly with respect to the shaft axis for the purpose of achieving a better mold-releasability.

The rotor assembly 2B shown in FIG. 2 has a reduced weight, primarily due to the smaller volume of the resin portion 41, compared to the rotor assembly 2A shown in FIG. 1, which contributes to enhancing the motor performance.

The components in the first and second embodiments are structured to be exchangeable. For example, the rotor assembly 2B in the second embodiment uses two magnets, specifically the magnets 6a and 6b, for the purpose of cost reduction, but may alternatively use one magnet like the rotor assembly 2A in the first embodiment. By exchanging components, respective advantages coming from the components used can be duly achieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

This application claims priority from Japanese Patent Application 2004-153671, filed May 24, 2004, and Japanese Patent Application 2005-086531, filed Mar. 24, 2005, both of which are incorporated herein by reference in their entirety.

What is claimed is:

1. A stepping motor comprising:
   (a) a stator assembly;
   (b) a rotor assembly rotatably disposed inside the stator assembly, and including
      a rotary shaft rotatably supported by bearings,
      a sleeve fixedly attached onto the rotary shaft,
      at least one magnet disposed outside the sleeve, and
      a resin portion which is disposed between the sleeve and the at least one magnet, covers an outer circumferential surface and a part of one end surface of the sleeve, and which has a circular cylindrical hollow for accommodating a preloading mechanism;
   (c) the preloading mechanism disposed between the sleeve and one of the bearings, and including
      a coil spring, and
      a spring holder including an outer case shaped in a cup-like configuration and an inner case shaped in a cup-like configuration, and housing the coil spring, the spring holder containing a reinforced polyamide resin as a material; and
   (d) a washer member, the washer member having a high slidability and disposed between the preloading mechanism and the one of the bearings.

2. A stepping motor according to claim 1, wherein the reinforced polyamide resin is a glass fiber-reinforced polyamide resin.

3. A stepping motor according to claim 1, wherein the washer member contains a resin with a high lubricating ability as a material.

4. A stepping motor according to claim 1, wherein the washer member has a larger diameter than the one of the bearings.

5. A stepping motor according to claim 1, wherein the resin portion is formed by resin injection molding.

6. A stepping motor according to claim 1, wherein the rotor assembly further includes back yokes, the at least one magnet is fixedly attached to the back yokes, and wherein the sleeve and the back yokes are fixed together by means of the resin portion.

7. A stepping motor according to claim 6, wherein the stepping motor is used for a vehicle.

* * * * *

UNITED STATES PATENT AND TRADEMARK OFFICE
CERTIFICATE OF CORRECTION

PATENT NO.        : 7,196,444 B2                                        Page 1 of 1
APPLICATION NO.   : 11/135650
DATED             : March 27, 2007
INVENTOR(S)       : Masato Hata et al.

It is certified that error appears in the above-identified patent and that said Letters Patent is hereby corrected as shown below:

On the Title page:

Please correct Item (75) Inventors to read:

-- (75)    Inventors:    Masato Hata, Shizuoka (JP); Yuzuru Suzuki, Shizuoka (JP); Atsushi Fukushima, Shizuoka (JP); Naoyuki Harada, Shizuoka (JP)            --

Signed and Sealed this

Twenty-sixth Day of June, 2007

JON W. DUDAS
*Director of the United States Patent and Trademark Office*